US011795286B2

(12) United States Patent
Takagi et al.

(10) Patent No.: US 11,795,286 B2
(45) Date of Patent: Oct. 24, 2023

(54) FOAM PARTICLE MOULDED ARTICLE, SOLE CUSHION, AND METHOD FOR PRODUCING FOAM PARTICLES

(71) Applicant: JSP Corporation, Tokyo (JP)

(72) Inventors: Shota Takagi, Yokkaichi (JP); Masaharu Oikawa, Tokyo (JP)

(73) Assignee: JSP Corporation, Tokyo (JP)

( * ) Notice: Subject to any disclaimer, the term of this patent is extended or adjusted under 35 U.S.C. 154(b) by 12 days.

(21) Appl. No.: 16/349,236

(22) PCT Filed: Nov. 13, 2017

(86) PCT No.: PCT/JP2017/040720
§ 371 (c)(1),
(2) Date: May 10, 2019

(87) PCT Pub. No.: WO2018/088551
PCT Pub. Date: May 17, 2018

(65) Prior Publication Data
US 2019/0276627 A1    Sep. 12, 2019

(30) Foreign Application Priority Data

Nov. 14, 2016 (JP) ................................. 2016-221947
Nov. 14, 2016 (JP) ................................. 2016-221948

(51) Int. Cl.
*C08J 9/232* (2006.01)
*C08J 9/18* (2006.01)
*C08L 53/00* (2006.01)
*C08J 9/228* (2006.01)
*A43B 13/04* (2006.01)

(52) U.S. Cl.
CPC ............... *C08J 9/232* (2013.01); *C08J 9/18* (2013.01); *C08J 9/228* (2013.01); *C08L 53/00* (2013.01); *A43B 13/04* (2013.01); *C08J 2201/026* (2013.01); *C08J 2203/22* (2013.01); *C08J 2353/00* (2013.01)

(58) Field of Classification Search
CPC ........................................................ C08J 9/18
See application file for complete search history.

(56) References Cited

U.S. PATENT DOCUMENTS

| 3,886,100 | A | * | 5/1975 | Yasuda | C08J 9/18 521/57 |
| 4,366,263 | A | | 12/1982 | Sato et al. | |
| 4,704,239 | A | * | 11/1987 | Yoshimura | B29C 44/3461 264/50 |
| 5,391,581 | A | * | 2/1995 | Kuwabara | C08J 9/18 521/58 |
| 5,622,756 | A | * | 4/1997 | Tokoro | B29C 67/205 428/220 |
| 6,133,331 | A | * | 10/2000 | Oikawa | C08J 9/0066 521/60 |
| 7,557,147 | B2 | * | 7/2009 | Martinez | C08J 9/04 521/142 |
| 2006/0223897 | A1 | * | 10/2006 | Sasaki | C08J 9/228 521/60 |
| 2014/0378566 | A1 | * | 12/2014 | Munro | C08L 75/04 521/132 |
| 2020/0032024 | A1 | * | 1/2020 | Takagi | C08J 9/20 |

FOREIGN PATENT DOCUMENTS

| JP | S56-151537 A | 11/1981 |
| JP | H03-224727 A | 10/1991 |
| JP | H04-126726 A | 4/1992 |
| JP | H08-108441 A | 4/1996 |
| JP | H10-329220 A | 12/1998 |
| JP | H11-343361 A | 12/1999 |
| JP | 2003-335892 A | 11/2003 |
| JP | 2006-008782 A | 1/2006 |
| JP | 2008-538377 A | 10/2008 |
| JP | 2011-184574 A | 9/2011 |
| JP | 2013-064137 A | 4/2013 |
| JP | 2013064137 | * 4/2013 |
| JP | 2016-017144 A | 2/2016 |
| JP | 2016-160300 A | 9/2016 |

OTHER PUBLICATIONS

Polymer Properties Database, Required Temperature for 1-hour and 10-hour Half-Time, flyer (Year: NA) (Year: NA).*
Infuse Olefin Block Copolymers flyer (Year: 2016).*
International Search Report for PCT/JP2017/040720, dated Feb. 13, 2018, and English Translation submitted herewith (5 pages).
Office Action issued in corresponding CN Application No. 201780069533.7 dated Jun. 2, 2021 (6 pages).

* cited by examiner

*Primary Examiner* — Irina Krylova
(74) *Attorney, Agent, or Firm* — Fitch, Even, Tabin & Flannery LLP

(57) ABSTRACT

The present invention relates to an in-mold expanded beads molded article of expanded beads of an olefin thermoplastic elastomer, a cushion for shoe sole, and a method of producing expanded beads provided with through-holes and composed of a block copolymer of a polyethylene block and an ethylene/α-olefin copolymer block, and with respect to the in-mold expanded beads molded article of expanded beads of an olefin thermoplastic elastomer, a voidage of the expanded beads molded article is 5 to 40%; a density of the expanded beads molded article is 30 to 150 g/L; and a flexural modulus of the olefin thermoplastic elastomer that constitutes the expanded beads molded article is 10 to 100 MPa.

5 Claims, No Drawings

FOAM PARTICLE MOULDED ARTICLE, SOLE CUSHION, AND METHOD FOR PRODUCING FOAM PARTICLES

CROSS-REFERENCE TO RELATED APPLICATIONS

This application is a U.S. national phase application filed under 35 U.S.C. § 371 of International Application Number PCT/JP2017/040720, filed Nov. 13, 2017, designating the United States, which claims priority from Japanese Application Number 2016-221948, filed Nov. 14, 2016, and Japanese Application Number 2016-221947, filed Nov. 14, 2016.

FIELD OF THE INVENTION

The present invention relates to an expanded beads molded article, a shoe sole cushion, and a method of producing expanded beads.

BACKGROUND OF THE INVENTION

In recent years, in order to obtain an expanded article with excellent flexibility, an expanded article containing an ethylene/α-olefin multi-block copolymer which has specified physical properties is disclosed (see, for example, PTL 1).

Meanwhile, it is disclosed that an expanded polyolefin-based resin molded article having a specified shape and having interconnected voids in order to obtain a favorable expanded molded article which has large compression strength and coefficient of permeability, has excellent fusion bonding properties, and is free from shrinkage or the like (see, for example, PTL 2).

CITATION LIST

Patent Literature

PTL 1: JP 2013-64137 A
PTL 2: JP 08-108441 A

SUMMARY OF INVENTION

However, in PTL 1, only the method of molding through press expansion is verified, but expanded beads for in-mold molding and expanded beads molded articles obtained through in-mold molding of expanded beads were not thoroughly reviewed.

In addition, in PTL 2, though various forms are shown as examples of base material resins of expanded beads, molded articles made of expanded thermoplastic elastomer beads are not thoroughly reviewed, and an issue remained from the viewpoint of restorability against compression. In addition, in PTL 2, expanded block copolymer particles of a polyethylene block and an ethylene/α-olefin copolymer block were not reviewed.

An object of a first embodiment of the present invention is to provide an expanded beads molded article in which both lightness in weight and restorability within a short time after compression release (hereinafter sometimes abbreviated simply as "restorability") are made compatible with each other.

An object of a second embodiment of the present invention is to provide expanded beads provided with through-holes and composed of a block copolymer of a polyethylene block and an ethylene/α-olefin copolymer block, the expanded beads being able to constitute the aforementioned expanded beads molded article, and a method of producing the same.

As a result of extensive and intensive investigations made by the present inventors, it has been found that by adopting the constitutions shown below, the aforementioned problems can be solved, thereby leading to accomplishment of the present invention.

Specifically, the first embodiment of the present invention is concerned with the following [1] to [6], and the second embodiment of the present invention is concerned with the following [7] to [12].

[1] An expanded beads molded article, which is an expanded beads molded article of expanded olefin thermoplastic elastomer beads, and has a voidage of 5 to 40% and a density of 30 to 150 g/L, a flexural modulus of an olefin thermoplastic elastomer that constitutes the expanded beads molded article being from 10 to 100 MPa.

[2] The expanded beads molded article as set forth in the above [1], wherein the olefin thermoplastic elastomer is a block copolymer of a polyethylene block and an ethylene/α-olefin copolymer block.

[3] The expanded beads molded article as set forth in the above [1] or [2], wherein a melting point of the olefin thermoplastic elastomer is from 100 to 130° C.

[4] The expanded beads molded article as set forth in any one of the above [1] to [3], wherein the olefin thermoplastic elastomer is a multi-block copolymer of a polyethylene block and an ethylene/α-olefin copolymer block.

[5] The expanded beads molded article as set forth in any one of the above [1] to [4], wherein the expanded beads have through-holes.

[6] A shoe sole cushion formed of the expanded beads molded article as set forth in any one of the above [1] to [5].

[7] A method of producing expanded beads composed of a block copolymer of a polyethylene block and an ethylene/α-olefin copolymer block, and provided with through-holes, the method including:

Step (a): a step of dispersing polymer particles provided with through-holes and composed of the block copolymer of a polyethylene block and an ethylene/α-olefin copolymer block in a dispersing medium within a closed vessel;

Step (b): a step of impregnating the polymer particles with an organic peroxide satisfying a relation of the following formula (1) and crosslinking the polymer particles at a temperature equal to or higher than a melting point of the block copolymer of a polyethylene block and an ethylene/α-olefin copolymer block, which constitutes the polymer particles, and not higher than a temperature of (the melting point+80° C.):

$$5 \leq (Tm - Th) \leq 45 \qquad (1)$$

wherein Tm represents a melting point (° C.) of the block copolymer of a polyethylene block and an ethylene/α-olefin copolymer block, which constitutes the polymer particles; and Th represents a 10-hour half-life temperature (° C.) of the organic peroxide;

Step (c): a step of impregnating the resulting polymer particles with a blowing agent; and Step (d): a step of expanding the resulting expandable polymer particles containing the blowing agent.

[8] The method of producing expanded beads as set forth in the above [7], wherein at least in the step (b), 0.01 to 5 parts by weight of a divalent or trivalent metal salt based on 100 parts by weight of the polymer particles is added to the dispersing medium.

[9] The method of producing expanded beads as set forth in the above [7] or [8], wherein in the step (b), the temperature at which the polymer particles are crosslinked satisfies a relation of the following formula (2):

$$10 \leq (Tm - Th) \leq 40 \quad (2).$$

[10] The method of producing expanded beads as set forth in any one of the above [7] to [9], wherein the 10-hour half-life temperature Th of the organic peroxide is from 80 to 110° C.

[11] The method of producing expanded beads as set forth in any one of the above [8] to [10], wherein the metal salt is aluminum sulfate.

[12] The method of producing expanded beads as set forth in any one of the above [7] to [11], wherein the block copolymer of a polyethylene block and an ethylene/α-olefin copolymer block, which constitutes the polymer particles, is a multi-block copolymer of a polyethylene block and an ethylene/α-olefin copolymer block.

In accordance with the first embodiment of the present invention, it is able to provide an expanded beads molded article in which both lightness in weight and restorability within a short time after compression release are made compatible with each other (the expanded beads molded article will be hereinafter sometimes referred to simply as "molded article").

The expanded beads molded article of the first embodiment of the present invention, which is an expanded beads molded article of expanded olefin thermoplastic elastomer beads, and has a voidage of 5 to 40% and a density of 30 to 150 g/L, and a flexural modulus of an olefin thermoplastic elastomer that constitutes the expanded beads molded article is 10 to 100 MPa.

In view of the fact that the density of the expanded beads molded article is 30 to 150 g/L, and the olefin thermoplastic elastomer that constitutes the expanded beads molded article has a specified flexural modulus, the restorability of voids which have been collapsed at the time of compression is excellent, and therefore, in accordance with the first embodiment of the present invention, it is able to provide an expanded beads molded article in which both lightness in weight and restorability within a short time are made compatible with each other.

In accordance with the second embodiment of the present invention, it is able to provide expanded beads that are composed of a block copolymer of a polyethylene block and an ethylene/α-olefin copolymer block and are provided with through-holes, the expanded beads being able to constitute an expanded beads molded article in which both lightness in weight and restorability within a short time after compression release are made compatible with each other (the block copolymer will be hereinafter sometimes referred to as "block copolymer (I)"); and a method of producing the same.

DESCRIPTION OF EMBODIMENTS

First Embodiment of the Present Invention

The expanded beads molded article of the first embodiment of the present invention is an expanded beads molded article of expanded olefin thermoplastic elastomer beads, in which a voidage of the molded article is 5 to 40%, a density of the molded article is 30 to 150 g/L, and a flexural modulus of an olefin thermoplastic elastomer that constitutes the molded article is 10 to 100 MPa.

(Density of Molded Article)

In the expanded beads molded article of the first embodiment of the present invention, the density of the molded article is 30 to 150 g/L. When the density of the expanded beads molded article is more than 150 g/L, there is a concern that the lightness in weight and the flexibility of the expanded beads molded article are impaired. On the other hand, when the density of the expanded beads molded article is less than 30 g/L, an expansion ratio of the expanded beads molded article is high, and therefore there is a concern that the strength of cell films of the expanded beads is insufficient. Then, the expanded beads molded article hardly resists the compression, and the dimensions of the expanded beads molded article after the compression are hardly restored.

From the aforementioned viewpoints, the upper limit of the density of the expanded beads molded article is preferably 125 g/L, and more preferably 100 g/L. The lower limit of the density of the expanded beads molded article is preferably 40 g/L, and still more preferably 45 g/L.

The expanded beads that form the expanded beads molded article of the first embodiment of the present invention are composed of an olefin thermoplastic elastomer. In view of the fact that the cell films of the expanded beads are composed of an olefin thermoplastic elastomer, the voids or cells which have been collapsed when the molded article was compressed are readily restored in a state before the compression.

The flexural modulus of the olefin thermoplastic elastomer that constitutes the expanded beads molded article is 10 to 100 MPa. In the case where the flexural modulus falls within the aforementioned range, the voids or cells which have been collapsed when a load was applied to the molded article are readily restored. From the aforementioned viewpoint, the upper limit of the flexural modulus is preferably 90 MPa, and more preferably 50 MPa. In addition, the lower limit of the flexural modulus is preferably 11 MPa, and more preferably 12 MPa.

The flexural modulus can be measured with respect to a test piece prepared by thoroughly degassing the expanded beads molded article several times by using a heat press in conformity with JIS K6767 (1999).

An upper limit of a type A durometer hardness (typically, occasionally referred to as "Shore A hardness") of the olefin thermoplastic elastomer that constitutes the expanded beads molded article is preferably 90, and more preferably 88. In addition, a lower limit of the type A durometer hardness is preferably 65, and more preferably 75. When the type A durometer hardness falls within the aforementioned range, the restorability of the expanded beads molded article is excellent, and the expanded beads molded article is also excellent in flexibility. The type A durometer hardness is a value measured with respect to a test piece prepared by thoroughly degassing the expanded beads molded article several times by using a heat press on a basis of ASTM D2240.

An upper limit of a density of the olefin thermoplastic elastomer that constitutes the expanded beads molded article is preferably 1,000 g/L, more preferably 900 g/L, and still more preferably 890 g/L. A lower limit of the density of the olefin thermoplastic elastomer is preferably 800 g/L, more preferably 850 g/L, and still more preferably 860 g/L.

A melting point of the olefin thermoplastic elastomer that constitutes the expanded beads molded article is preferably 100 to 130° C., and more preferably 115 to 125° C. When the melting point of the olefin thermoplastic elastomer falls within the aforementioned range, a compression set at a high temperature can be made smaller.

Examples of the olefin thermoplastic elastomer that constitutes the expanded beads molded article include a mixture constituted of a hard segment composed of a propylene resin or the like and a soft segment composed of an ethylene rubber, and a block copolymer of a hard segment composed of a polyethylene block and a soft segment composed of an ethylene/α-olefin copolymer block.

In the mixture constituted of a propylene resin and an ethylene rubber, examples of the propylene resin include a propylene homopolymer and a copolymer of propylene and ethylene or an α-olefin having 4 to 8 carbon atoms. Meanwhile, examples of the ethylene rubber include a copolymer of ethylene and an α-olefin having 3 to 8 carbon atoms, and a copolymer obtained by further copolymerizing a non-conjugated diene, such as 5-vinyl-2-norbornene, 5-ethylidene-2-norbornene, 5-methylene-2-norbornene, and dicyclopentadiene.

In the block copolymer of a polyethylene block and an ethylene/α-olefin copolymer block, examples of the polyethylene block include an ethylene homopolymer and a copolymer of ethylene and an α-olefin having 3 to 8 carbon atoms. Meanwhile, examples of the ethylene/α-olefin copolymer block include a block of a copolymer of ethylene and an α-olefin having 3 to 20 carbon atoms, and examples of the α-olefin to be copolymerized with ethylene include propylene, 1-butene, 1-pentene, 1-hexene, 1-heptene, 1-octene, 1-nonene, 1-decene, 3-methyl-1-butene, and 4-methyl-1-pentene. Above all, propylene, 1-butene, 1-hexene, and 1-octene are preferred, and 1-octene is especially preferred. A proportion of the ethylene component in the polyethylene block is preferably 95% by weight or more, and more preferably 98% by weight or more relative to the weight of the polyethylene block. Meanwhile, a proportion of the α-olefin component in the ethylene/α-olefin copolymer block is preferably 5% by weight or more, more preferably 10% by weight or more, and still more preferably 15% by weight or more relative to the weight of the ethylene/α-olefin copolymer block. The proportion of the polyethylene block and the proportion of the ethylene/α-olefin copolymer block can be calculated on a basis of data obtained by means of differential scanning calorimetry (DSC) or nuclear magnetic resonance (NMR).

Examples of the olefin thermoplastic elastomer include commercially available products, such as a trade name "THERMORUN" (manufactured by Mitsubishi Chemical Corporation), a trade name "MILASTOMER" (manufactured by Mitsui Chemicals, Inc.), a trade name "SUMITOMO TPE" (manufactured by Sumitomo Chemical Co., Ltd.), and a trade name "INFUSE" (manufactured by The Dow Chemical Company).

(Block Copolymer (I))

Although the block copolymer (I) may have any of a diblock structure, a triblock structure, and a multi-block structure, in particular, it has preferably a multi-block structure.

Among those as mentioned above, from the viewpoint that the restorability at a high temperature is improved, a multi-block copolymer of a polyethylene block and an ethylene/α-olefin copolymer block (hereinafter sometimes referred to simply as "multi-block copolymer") is especially preferred. The polyethylene block is corresponding to a hard block, and the ethylene/α-olefin copolymer block is corresponding to a soft block. It is preferred that the hard block and the soft block are linearly configured.

Examples of the multi-block copolymer include the ethylene/α-olefin copolymer described in PTL 1. In addition, examples of the commercially available products of the multi-block copolymer include a trade name "INFUSE", manufactured by The Dow Chemical Company.

(Xylene Insoluble Content of Expanded Beads Molded Article by Hot Xylene Extraction Method)

A xylene insoluble content of the expanded beads molded article by the hot xylene extraction method (hereinafter referred to simply as "xylene insoluble content") is preferably 30 to 70% by weight.

So long as the xylene insoluble content falls within the aforementioned range, the thermoplastic elastomer that constitutes the expanded beads has a crosslinking structure, and therefore, the expanded beads molded article having a specified apparent density is readily restored to the original state relative to the compression force, and in particular, it is excellent in restorability. From the aforementioned viewpoint, the upper limit of the xylene insoluble content of the expanded beads molded article is preferably 60% by weight, and more preferably 55% by weight. In addition, the lower limit of the xylene insoluble content of the expanded beads molded article is preferably 35% by weight, and more preferably 40% by weight.

(Fusion Bonding Properties)

The fusion bonding properties of the expanded beads molded article can be evaluated from a degree of material fracture (degree of fusion bonding) when the expanded beads molded article is bent and broken. The degree of material fracture (degree of fusion bonding) is a ratio of material-fractured expanded beads among the expanded beads exposed on the broken surface when the expanded beads molded article is bent and broken. The degree of material fracture is preferably 80% or more, and more preferably 90% or more. When the fusion bonding properties of the expanded beads molded article fall within the aforementioned range, the expanded beads molded article is excellent in physical properties, such as maximum tensile stress and tensile fracture elongation, and becomes a molded article suitable for applications, such as a sheet cushioning material, a sports pad material, and a shoe sole material.

(Compression Set)

In the expanded beads molded article of the first embodiment of the present invention, a compression set at 23° C. is preferably 5% or less. The compression set at 23° C. is measured in such a manner that the molded article is compressed at 23° C. for 22 hours in a strained state to an extent of 25% and then released into an atmospheric pressure at a temperature of 23° C., followed by allowing to elapse for 22 hours. The compression set at 23° C. is more preferably 3% or less, and still more preferably 2% or less. In addition, the compression set measured by compressing the molded article in the same manner as that mentioned above and then releasing, followed by allowing to elapse for 30 minutes is preferably 15% or less.

In the expanded beads molded article of the first embodiment of the present invention, a compression set at 50° C. is preferably 10% or less. The compression set at 50° C. is measured in such a manner that the molded article is compressed at 50° C. for 22 hours in a strained state to an extent of 25% and then released into an atmospheric pressure at a temperature of 50° C., followed by allowing to elapse for 22 hours. The compression set at 50° C. is more preferably 8% or less, and still more preferably 7% or less. In addition, the compression set measured by compressing the molded article in the same manner as that mentioned above and then releasing, followed by allowing to elapse for 30 minutes is preferably 20% or less.

When the compression set of the expanded beads molded article falls within the aforementioned range, the expanded beads molded article after compression is excellent in restorability of the shape, and therefore, it becomes a molded article suitable for applications, such as a sheet cushioning material, a sports pad material, and a shoe sole material.

In particular, in the expanded beads molded article of the first embodiment of the present invention, voids are formed in the molded article. This void portion is restored within a shorter time after compression, and therefore, the compression set after 30 minutes after compression release becomes smaller. In addition, the expanded beads molded article of the first embodiment of the present invention has excellent restorability even under a high-temperature compression condition.

The compression set is needed to be measured in conformity with JIS K6767 (1999).

(Voidage)

In the expanded beads molded article of the first embodiment of the present invention, a voidage of the molded article is 5 to 40%. When the voidage of the expanded beads molded article is less than 5%, cell portions of the expanded beads are liable to be collapsed along with the voids at the time of compression of the molded article, and therefore, there is a concern that the restorability of the molded article at the time of compression release is lowered. When the voidage of the expanded beads molded article is more than 40%, the voids become excessive, and bonding of the expanded beads to each other becomes weak, so that there is a concern that the strength of the molded article at the time of compression cannot be kept.

In consequence, from the viewpoint that the restorability of the expanded beads molded article is improved, the upper limit of the voidage of the expanded beads molded article is preferably 35%, more preferably 32%, and still more preferably 30%. In addition, the lower limit of the voidage of the expanded beads molded article is preferably 8%, more preferably 10%, and still more preferably 12%.

Examples of the void to be formed in the molded article include voids existing between the expanded beads that constitute the expanded beads molded article and voids to be formed as through-holes, etc. in the expanded beads themselves. As for these voids, the matter that voids interconnecting with the exterior of the molded article are formed is preferred from the viewpoint of restorability.

It is preferred that the expanded beads that form the expanded beads molded article of the first embodiment of the present invention are provided with through-holes or non-through-holes.

The shape of the expanded beads provided with non-through-holes is the same as that of the expanded beads provided with through-holes, except that one side of the hole is closed. In addition, a preferred embodiment of the cross-sectional shape of the hole, a preferred embodiment of the cross-sectional shape of the expanded beads, a preferred combination of a preferred embodiment of the cross-sectional shape of the hole and a preferred embodiment of the cross-sectional shape of the expanded beads, and a preferred embodiment of the inside diameter of the expanded beads are also the same.

Above all, from the viewpoint of restorability as well as uniform physical properties, the expanded beads are preferably those provided with through-holes.

When the expanded beads are provided with through-holes, voids exist in a portion of holes of the expanded beads that form the expanded beads molded article. In the expanded beads molded article in which such expanded beads provided with through-holes are subjected to in-mold molding, more uniform voids with no directionality are formed within the expanded beads molded article. In consequence, it may be considered that the restorability of the molded article is more improved.

In the case where a load is applied to the expanded beads molded article, a void portion of the molded article, namely a portion of holes of the expanded beads is preferentially collapsed. On the other hand, a cell portion of the expanded beads is hardly collapsed relatively. In consequence, when the load is released, the void portion is restored to the original value preferentially fast, and therefore, it may be considered that the excellent restorability as the expanded beads molded article can be exhibited.

The shape of the through-holes with which the expanded beads are provided is not particularly limited, typically, the contour of the hole on a surface orthogonal to the axial direction of the hole (hereinafter referred to as "cross-sectional shape of hole") is preferably circular. But, the cross-sectional shape of hole may also be any of an ellipse, a rectangle, a trapezoid, a triangle, a pentagon or polygon, and an amorphous form. In addition, the shape of the expanded beads is not particularly limited, too, and it may be either spherical or polyhedral. In addition, the cross-sectional shape of the expanded beads may be a columnar form of a circle, a rectangle, a trapezoid, a triangle, a pentagon or polygon, or an amorphous form.

Among those mentioned above, the expanded beads provided with through-holes are more preferably in a cylindrical form, in which the cross-sectional shape of the expanded beads is circular, and the cross-sectional shape of hole is circular. The word "circular" include "substantially circular".

From the viewpoint of restorability of the expanded beads molded article within a short time, an upper limit of the inside diameter of the expanded beads (major axis of the cross-sectional shape of hole) is preferably 7 mm, and more preferably 5 mm. In addition, a lower limit of the inside diameter of the expanded beads (major axis of the cross-sectional shape of hole) is preferably 1 mm, and more preferably 1.5 mm.

The inside diameter of the expanded beads may be not fixed. For example, the inside diameter of one side of the end of the through-hole may be small, whereas the inside diameter of the other side may be large. In addition, the inside diameter in the vicinity of the center of the expanded beads may be larger than the inside diameter of the both ends of the through-hole of the expanded beads, whereas the inside diameter in the vicinity of the center of the expanded beads may be smaller than the inside diameter of the both ends of the through-hole of the expanded beads.

From the viewpoint of easiness on the occasion of putting the expanded beads into a mold, an upper limit of the length in the axial direction of the through-hole is preferably 10 mm, and more preferably 7 mm. A lower limit of the length in the axial direction of the through-hole is preferably 1 mm, and more preferably 1.5 mm.

An apparent density of the expanded beads is preferably 40 to 200 g/L. When the apparent density of the expanded beads is 40 g/L or more, the expanded beads or the molded article is excellent in restorability, and a molded article having a target shape is readily obtained. In addition, the restorability of compression set of the molded article is excellent, and a mechanical performance suitable for the purpose is readily obtained. When the apparent density is 200 g/L or less, a thorough cushioning characteristic is obtained, and the product has lightness in weight. From the aforementioned viewpoints, the upper limit of the apparent density of the expanded beads is preferably 195 g/L, more preferably 150 g/L, and still more preferably 100 g/L. The lower limit thereof is 60 g/L.

The apparent density of the expanded beads can be measured in the following manner. A 200-mL graduated measuring cylinder charged with 100 mL of ethanol is prepared. Expanded beads having a bulk volume of about 50 mL, whose weight Wa (g) has been weighed in advance, are sunk in ethanol in the 200-mL graduated measuring cylinder by using a metal net or the like. At this time, a volume Va (L) of an elevation of the liquid level is read. Then, by determining Wa/Va, the apparent density of the expanded beads is calculated.

An upper limit of a bulk density of the expanded beads is preferably 120 g/L, more preferably 110 g/L, still more preferably 105 g/L, especially preferably 100 g/L, and most preferably 80 g/L. In addition, a lower limit of the bulk density of the expanded beads is preferably 25 g/L, more preferably 30 g/L, and still more preferably 35 g/L. When the bulk density of the expanded beads is allowed to fall within the aforementioned range, the lightness in weight, the flexibility, and the rebound property of the expanded beads molded article produced through in-mold molding of the expanded beads become more favorable.

The bulk density of the expanded beads is measured in the following manner. The expanded beads are randomly taken out from the group of expanded beads and put into a graduated measuring cylinder having a capacity of 1 liter. A large number of expanded beads are accommodated to an extent of a scale of 1 liter such that they become in a naturally accumulated state. The bulk density of the expanded beads is calculated according to the computation from a weight (Wb) and an accommodated volume (1 liter) of the accommodated expanded beads.

An upper limit of an average bead diameter of the expanded beads is preferably 10 mm, more preferably 8 mm, and still more preferably 5 mm. In addition, a lower limit of the average bead diameter of the expanded beads is preferably 0.5 mm, more preferably 1 mm, and still more preferably 2 mm. When the average bead diameter of the expanded beads falls within the aforementioned range, not only the production of expanded beads is easy, but also when subjecting the expanded beads to in-mold molding, it becomes easy to fill the expanded beads within a mold. The average bead diameter of the expanded beads can be controlled, for example, by the amount of the blowing agent, the expanding condition, the particle diameter of the polymer particles, and the like.

Examples of the production method of expanded beads include a method in which the olefin thermoplastic elastomer and the blowing agent are supplied into an extruder and melted, the olefin thermoplastic elastomer is extruded and expanded from a die annexed in a tip of the extruder, to produce an expanded article of the olefin thermoplastic elastomer, and the expanded article is then cut in a bead-like form. In addition, there is a method in which after producing the particles of the olefin thermoplastic elastomer, the particles are impregnated with the blowing agent within a closed vessel to prepare expandable particles, and the expandable particles are released from the closed vessel, to obtain the expanded beads. Furthermore, examples of other methods include a method in which the expandable particles of the olefin thermoplastic elastomer obtained in the aforementioned method are taken out from the closed vessel, dehydrated, and dried, and the expandable particles are then heated with a heating medium to cause expansion, thereby producing expanded beads.

In view of the fact that the olefin thermoplastic elastomer is crosslinked, the expanded beads are improved with respect to expandability and moldability. Specifically, when the expandable crosslinked particles which are obtained by a step including steps (A) to (C) as mentioned later are released from the closed vessel, the expanded beads are obtained. The crosslinking method on this occasion is not limited to crosslinking with an organic peroxide, and examples thereof include other known methods, such as crosslinking adopting an electron beam crosslinking method.

In the method of obtaining the expanded beads after producing the particles of the olefin thermoplastic elastomer, in the case of forming through-holes in the expanded beads, on the occasion of producing the particles of the olefin thermoplastic elastomer, by providing an outlet of the extruder with a slit having a specified shape, particles provided with desired through-holes are formed. In addition, by pushing a projection having a specified cross-sectional shape against the molten and extruded particles, the through-holes can also be formed in the resin particles. Then, by expanding these particles, the expanded beads provided with through-holes are obtained.

(Blowing Agent)

The blowing agent is not particularly limited so long as it is able to expand the crosslinked particles and the like to form the expanded beads. Examples of the blowing agent include inorganic physical blowing agents, such as air, nitrogen, carbon dioxide, argon, helium, oxygen, and neon; and organic physical blowing agents, such as an aliphatic hydrocarbon, e.g., propane, n-butane, isobutane, n-pentane, isopentane, and n-hexane, an alicyclic hydrocarbon, e.g., cyclohexane and cyclopentane, a halogenated hydrocarbon, e.g., chlorofluoromethane, trifluoromethane, 1,1-difluoroethane, 1,1,1,2-tetrafluoroethane, methyl chloride, ethyl chloride, and methylene chloride, and a dialkyl ether, e.g., dimethyl ether, diethyl ether, and methyl ethyl ether. Among these, inorganic physical blowing agents which are not only free from fracture of an ozone layer but also inexpensive are preferred, nitrogen, air, and carbon dioxide are more preferred, and carbon dioxide is especially preferred. These blowing agents can be used alone or in combination of two or more thereof.

Although the blending amount of the blowing agent is determined in consideration of the apparent density of the target expanded beads, the kind of the olefin thermoplastic elastomer, the kind of the blowing agent, and the like, in general, it is preferred to use the organic physical blowing agent in an amount of 2 to 20 parts by weight and the inorganic physical blowing agent in an amount of 0.5 to 20 parts by weight, respectively based on 100 parts by weight of the olefin thermoplastic elastomer.

(Other Additive)

To the particles of the olefin thermoplastic elastomer, other additive can be added within a range where the object and effects of the first embodiment of the present invention are not impaired. Examples of the other additive include an antioxidant, an ultraviolet ray absorbent, an antistatic agent, a flame retardant, a flame retarding assistant, a cell nucleating agent, a plasticizer, a light stabilizer, an antibacterial agent, a metal deactivator, a conductive filler, and a cell controlling agent. Examples of the cell controlling agent include inorganic powders, such as zinc borate, talc, calcium carbonate, borax, aluminum hydroxide, silica, zeolite, and carbon; and organic powders, such as a phosphate-based nucleating agent, a phenol-based nucleating agent, an amine-based nucleating agent, and a polyfluoroethylene resin powder. The amount of the additives in total is preferably 20 parts by weight or less, more preferably 10 parts by weight or less, and still more preferably 5 parts by weight or less based on 100 parts by weight of the olefin thermoplastic elastomer. In particular, a proportion of the cell controlling agent is preferably 0.01 to 1 part by weight based on 100 parts by weight of the olefin thermoplastic elastomer. The additives are typically used in a minimum necessary amount. The additives can be blended by the following method. For example, in a method in which after producing the particles of the olefin thermoplastic elastomer, the particles are impregnated with the blowing agent within a closed vessel to prepare expandable particles, and the expandable particles are released from the closed vessel, to obtain the expanded beads, on the occasion of producing the particles of the olefin thermoplastic elastomer, the additives are added and kneaded together with the olefin thermoplastic elastomer within an extruder, whereby the additives are blended in the particles.

As an example of the production method of the expanded beads molded article of the expanded beads of the olefin thermoplastic elastomer, though a production method of expanded beads composed of a block copolymer (block copolymer (I)) of a polyethylene block and an ethylene/α-olefin copolymer block, which is the olefin thermoplastic elastomer, and a production method of an expanded beads molded article are hereunder described in detail, but it should be construed that the present invention is not limited to the following methods.

The expanded beads of the block copolymer (I) can be, for example, produced through the following steps (A) to (D). The following production steps of the expanded beads can be simultaneously performed as one sequence in a single closed vessel. In addition, after each of the steps, the product obtained in that step is extracted each time and again put into the closed vessel, whereby the treatment of the separate step can be performed, too.

Step (A): A dispersion step of dispersing the block copolymer (I) particles provided with through-holes and a crosslinking agent in a dispersing medium within a closed vessel;

Step (B): A crosslinking step of heating the block copolymer (I) particles provided with through-holes at a temperature equal to or higher than a temperature at which the block copolymer (I) particles are softened, and the crosslinking agent is substantially decomposed, thereby obtaining crosslinked particles of the block copolymer (I);

Step (C): An impregnation step of adding a blowing agent to the dispersing medium to thereby impregnate the block copolymer (I) particles with the blowing agent, thereby obtaining expandable particles; and Step (D): An expansion step of releasing the crosslinked particles of the expandable block copolymer (I) into an atmosphere under a pressure lower than a pressure within the closed vessel, thereby producing expanded beads.

(1) Step (A)

In the step (A), the block copolymer (I) particles provided with through-holes and a crosslinking agent are dispersed in a dispersing medium within a closed vessel.

Specifically, the block copolymer (I) particles can be obtained by the following method. First of all, the block copolymer (I) is supplied into an extruder and melt kneaded to form a molten kneaded product. Then, the molten kneaded product is extruded in a strand-like form, thereby producing the block copolymer (I) particles. The strand is cut into a size suitable for preparation of expanded beads by a known granulation method. For example, the molten kneaded product which has been extruded and molded in a strand-like form in the aforementioned method is cooled by means of water cooling and then cut into a predetermined length, whereby polymer particles of the block copolymer (I) can be obtained. On the occasion of cutting into a predetermined length, for example, a strand cutting method can be adopted. Besides, a hot cutting method of cutting the molten kneaded product immediately after extrusion, an underwater cutting method of cutting in water, or the like can be adopted.

A method of forming through-holes in the block copolymer (I) particles is not particularly limited.

For example, in order to obtain the block copolymer (I) particles provided with through-holes, the block copolymer (I) particles may be produced by selecting an extruder having, in a die outlet thereof, a slit having the same shape as the cross-sectional shape of desired holes, and extruding the molten kneaded product therefrom.

An upper limit of an average weight per one block copolymer (I) particle is preferably 10 mg, and more preferably 5 mg. In addition, a lower limit of the average weight is preferably 0.01 mg, and more preferably 0.1 mg. The average weight of the polymer particle is a value obtained by dividing a weight (mg) of randomly selected 100 polymer particles by 100.

On the occasion of obtaining the block copolymer (I) particles, an upper limit of a melt flow rate (MFR) at 190° C. under a load of 2.16 kg of the block copolymer (I) is preferably 10 g/10 min, more preferably 8 g/10 min, and still more preferably 7 g/10 min. In addition, a lower limit of the melt flow rate (MFR) is preferably 2 g/10 min, more preferably 3 g/10 min, and still more preferably 4 g/10 min. The melt flow rate can be measured under a condition at a temperature 190° C. under a load of 2.16 kg in conformity with JIS K7210-1 (2014).

(Dispersing Medium)

The dispersing medium which is used in the step (A) is not particularly limited so long as it is a dispersing medium which does not dissolve the block copolymer (I) particles therein. Examples of the dispersing medium include water, ethylene glycol, glycerin, methanol, and ethanol. As the dispersing medium, water is preferred.

In the step (A), a dispersant may be further added to the dispersing medium. Examples of the dispersant include organic dispersants, such as polyvinyl alcohol, polyvinylpyrrolidone, and methyl cellulose; and sparingly soluble inorganic salts, such as aluminum oxide, zinc oxide, kaolin, mica, magnesium phosphate, and tricalcium phosphate. In addition, a surfactant can be further added to the dispersing medium. Examples of the surfactant include sodium oleate, and sodium dodecylbenzenesulfonate, and besides, anionic surfactants and nonionic surfactants that are ordinarily used in suspension polymerization.

In the dispersing medium, a divalent or trivalent water-soluble metal salt can be added. Although the reason is not elucidated yet, when the water-soluble metal salt is added, the through-holes or non-through-holes of the expanded beads obtained in the step (D) become readily large as compared with expanded beads produced without adding the metal salt. As the divalent or trivalent water-soluble metal salt, a compound having a low degree of hydration is preferably used, and for example, aluminum sulfate can be used. The addition amount of aluminum sulfate is preferably 0.001 to 0.1 part by weight, and more preferably 0.005 to 0.08 part by weight based on 100 parts by weight of the block copolymer (I) particles.

(Closed Vessel)

The closed vessel to be used in the step (A) is not particularly limited so long as it is a sealable vessel. The block copolymer (I) particles are heated in the step (B) as mentioned later, and the pressure within the closed vessel is increased, and therefore, the closed vessel is required to withstand the increase of the pressure in the step (B). For example, an autoclave is used for the closed vessel.
(Crosslinking Agent)

In order to crosslink the block copolymer (I) particles in the step (B), a crosslinking agent is used. The crosslinking agent may be added to the dispersing medium in advance, or may be added to the dispersing medium after dispersing the block copolymer (I) particles therein.

The crosslinking agent is not particularly limited so long as it is able to crosslink the block copolymer (I) particles. Examples of the crosslinking agent include peroxides, such as 2,5-t-butyl perbenzoate (10-hour half-life temperature: 104° C.), 1,1-bis-t-butylperoxycyclohexane (10-hour half-life temperature: 91° C.), 1,1-di(t-hexylperoxy)cyclohexane (10-hour half-life temperature: 87° C.), and t-butylperoxy-2-ethylhexyl monocarbonate (10-hour half-life temperature: 99° C.). These can be used alone or in combination of two or more thereof.

In the foregoing, an upper limit of the 10-hour half-life temperature of the crosslinking agent is preferably 105° C., and a lower limit thereof is preferably 75° C. By using a crosslinking agent having such a half-life temperature, in the step (D), even when the crosslinked particles are expanded, the through-holes are hardly collapsed. An upper limit of a 10-hour half-life temperature of the crosslinking agent is more preferably 100° C., and a lower limit thereof is more preferably 80° C.

The blending amount of the crosslinking agent is preferably 0.1 to 5 parts by weight, and more preferably 0.2 to 2.5 parts by weight based on 100 parts by weight of the block copolymer (I). When the blending amount of the crosslinking agent falls within the aforementioned range, the efficiency of the crosslinking is improved, and crosslinked particles having an appropriate xylene insoluble content are obtained. In addition, the resulting crosslinked particles can be thoroughly expanded, and a strength can be given to the polymer particles such that they can thoroughly withstand the expansion.

(2) Step (B)

In the step (B), it is preferred to impregnate the block copolymer (I) particles with an organic peroxide at a temperature lower than a temperature at which crosslinking of the block copolymer (I) provided with through-holes commences (such a temperature will be sometimes referred to as "impregnation temperature"). The impregnation temperature is not particularly limited so long as it is a temperature lower than a decomposition temperature of the organic peroxide to be used in the step (B) (in the case of using plural organic peroxides, the lowest decomposition temperature is made as a reference), and though it varies with the kind of the organic peroxide to be used, it is typically 90 to 130° C.

Subsequently, by heating the block copolymer (I) particles provided with through-holes at a temperature equal to or higher than a temperature at which the block copolymer (I) particles are softened, and the crosslinking agent is substantially decomposed (such a temperature will be sometimes referred to as "crosslinking temperature"), crosslinked particles of the block copolymer (I) provided with through-holes are obtained. Specifically, the block copolymer (I) is heated within a closed vessel at a temperature equal to or higher than a temperature at which the block copolymer (I) is softened, and the crosslinking agent is substantially decomposed. Although the heating temperature (crosslinking temperature) for crosslinking is not particularly limited, for example, it is in a range of 100 to 170° C. According to this, crosslinkage is generated in the block copolymer (I). A xylene insoluble content of the resulting expanded beads is preferably 30 to 70% by weight. As the organic peroxide, one satisfying a relation of the following formula is preferably used.

$$5 \le (Tm - Th) \le 45$$

wherein Tm represents a melting point (° C.) of the block copolymer (I); and Th represents a 10-hour half-life temperature (° C.) of the organic peroxide.

The crosslinking temperature is preferably a temperature equal to or higher than the melting point of the block copolymer (I) that constitutes the polymer particles and not higher than a temperature of (the melting point+80° C.).

(3) Step (C)

In the step (C), a blowing agent is added within the closed vessel, so that the block copolymer (I) particles provided with through-holes are impregnated with the blowing agent.

Specifically, the blowing agent for expanding the block copolymer (I) particles is added within the closed vessel, thereby impregnating the particles in a softened state with the blowing agent. Although a temperature of performing the impregnation with the blowing agent is not particularly limited so long as it is a temperature equal to or higher than a temperature at which the block copolymer (I) particles become in a softened state, it is, for example, in a range of 100 to 170° C. As the blowing agent, the aforementioned blowing agent can be used, and an inorganic physical blowing agent is more preferred, and carbon dioxide is still more preferred.

The step (C) has only to be performed before the step (D), and it may be performed during the step (A) or after the step (A), or during the step (B) or after the step (B).

(4) Step (D)

In the step (D), the block copolymer (I) particles provided with through-holes are released into an atmosphere under a pressure lower than a pressure within the closed vessel, thereby producing expanded beads provided with through-holes.

Specifically, the crosslinked particles of the block copolymer (I) which has been impregnated with the blowing agent in the step (C) (hereinafter sometimes referred to as "expandable crosslinked particles") are released into an atmosphere under a pressure lower than a pressure within the closed vessel, to expand the expandable crosslinked particles, thereby producing expanded beads. It is preferred to perform the aforementioned crosslinking step and blowing agent impregnation step and an expansion step as mentioned later, namely the steps (A) to (D) as one sequence in a single closed vessel.

[Molded Article]

The expanded beads molded article of the first embodiment of the present invention is preferably an in-mold molded article of the already-mentioned expanded olefin thermoplastic elastomer beads.

The expanded beads molded article can be obtained by filling the expanded beads within a mold and then heat molding with a heating medium, such as steam, according to a conventionally known method. Specifically, after filling the expanded beads within a mold, by introducing a heating medium, such as steam, into the mold, to heat and expand the expanded beads, and the expanded beads are fusion bonded to each other, whereby an expanded beads molded article having a shape of a molding cavity shaped therein can be obtained.

As for the in-mold molding in the first embodiment of the present invention, it is preferred to perform molding by a compression molding method, in which the expanded beads are subjected to a pressurizing treatment with a pressurizing gas, such as air, in advance to increase the pressure within the expanded beads; the pressure within the expanded beads is regulated to 0.01 to 0.2 MPa (G) (G means a gauge pressure); the expanded beads are filled within a mold cavity under atmospheric pressure or reduced pressure; and after closing the mold, a heating medium, such as steam, is supplied into the mold, so as to fusion bond the expanded beads to each other (for example, the method described in JP 51-22951 B). In addition, the molding can be performed by a compression filling molding method, in which in a cavity having been pressurized to a pressure equal to or higher than the atmospheric pressure with a compressed gas, the expanded beads having been pressurized to a pressure equal to or higher than that pressure are filled, and a heating medium, such as steam, is then supplied into the cavity, so as to fusion bond the expanded beads to each other (see JP 4-46217 B). Besides, the molding can be performed by an atmospheric filling molding method, in which the expanded beads having a high secondary expansion force to be obtained under a special condition are filled within a cavity of female and male molds under atmospheric pressure or reduced pressure, and a heating medium, such as steam, is then supplied for heating, so as to fusion bond the expanded beads to each other (see JP 6-49795 B), or a method combining the aforementioned methods (see JP 6-22919 B).

The expanded beads molded article can also be, for example, a molded article obtained by bonding the expanded beads to each other with an adhesive or the like. From the viewpoints of environmental adaptability and so on, the expanded beads molded article is preferably an in-mold expanded beads molded article.

Second Embodiment of the Present Invention

The second embodiment of the present invention is concerned with a method of producing expanded beads provided with through-holes and is a method of producing expanded beads which is able to constitute an expanded beads molded article in which both lightness in weight and restorability within a short time after compression release are made compatible with each other. Next, the production method of expanded beads according to the second embodiment of the present invention, namely a production method of expanded beads provided with through-holes and composed of a block copolymer (I) of a polyethylene block and an ethylene/α-olefin copolymer block is described.

1. Production Method of Expanded Beads

The production method of expanded beads of the second embodiment of the present invention is a method of producing expanded beads provided with through-holes and composed of a block copolymer of a polyethylene block and an ethylene/α-olefin copolymer block, the method including:

Step (a): a step of dispersing polymer particles provided with through-holes and composed of the block copolymer of a polyethylene block and an ethylene/α-olefin copolymer block in a dispersing medium within a closed vessel;

Step (b): a step of impregnating the polymer particles with an organic peroxide satisfying a relation of the following formula, and crosslinking the polymer particles at a temperature equal to or higher than a melting point of the block copolymer of a polyethylene block and an ethylene/α-olefin copolymer block, which constitutes the polymer particles, and not higher than a temperature of (the melting point+80° C.);

Step (c): a step of impregnating the polymer particles with a blowing agent; and Step (d): a step of expanding expandable polymer particles containing the blowing agent:

$$5 \leq (Tm - Th) \leq 45 \quad (1)$$

wherein Tm represents a melting point (° C.) of the block copolymer of a polyethylene block and an ethylene/α-olefin copolymer block, which constitutes the polymer particles; and Th represents a 10-hour half-life temperature (° C.) of the organic peroxide.

Expanded beads provided with through-holes can be obtained by the production method including the aforementioned steps (a) to (d). The production method of expanded beads of the second embodiment of the present invention may include other step than the steps (a) to (d), and in each step of the steps (a) to (d), other component may further be added, or other step may be included. In addition, the steps (a) to (c) may be simultaneously performed.

(Block Copolymer (I))

The block copolymer of a polyethylene block and an ethylene/α-olefin copolymer block, which is produced by the second embodiment of the present invention, is the same as the aforementioned block copolymer (I).

(1) Step (a)

The step (a) is a step of dispersing polymer particles provided with through-holes and composed of the block copolymer of a polyethylene block and an ethylene/α-olefin copolymer block in a dispersing medium within a closed vessel.

[Polymer Particles]

The polymer particles to be used in the step (a) are composed of the already-mentioned block copolymer of a polyethylene block and an ethylene/α-olefin copolymer block and are provided with through-holes. In addition, the polymer particles which are used in the step (A) can be used and can be produced in the same manner as in the step (A).

From the viewpoint of maintaining the shape of the through-holes, an inside diameter of the polymer particles (major axis of the cross-sectional shape of hole) is preferably 0.2 to 5 mm, and more preferably 0.5 to 3 mm. The inside diameter of the expanded beads may be not fixed, and for example, the inside diameter of one side of the end of the through-hole may be smaller, whereas the inside diameter of the other side may be larger, or the through-hole may be one with different diameters such that the inside diameter in the vicinity of the center of the polymer particles is larger or smaller than the inside diameter of the both ends of the through-hole on the surface side of the polymer particles.

A length in the axial direction of the through-hole is preferably 0.5 to 10 mm, and more preferably 1 to 7 mm.

From the viewpoint of moldability as well as filling properties in a mold, an outside diameter of the polymer particles is preferably 0.5 to 5 mm, and more preferably 0.8 to 3 mm. In addition, a ratio of the inside diameter of the polymer particles to the outside diameter of the polymer particles is preferably 0.1 to 0.8, and still more preferably 0.2 to 0.7. When the foregoing ratio falls within the aforementioned range, it is possible to obtain expanded beads provided with through-holes.

(2) Step (b)

The step (b) is a step of impregnating the polymer particles with an organic peroxide satisfying a relation of the following formula (1), and crosslinking the polymer particles at a temperature equal to or higher than a melting point of the block copolymer that constitutes the aforementioned polymer particles and not higher than a temperature of (the melting point+80° C.), to obtain polymer particles. By passing through the step (b), the polymer particles become crosslinked polymer particles.

$$5 \leq (Tm-Th) \leq 45 \quad (1)$$

In the formula (1), Tm represents a melting point (° C.) of the aforementioned block copolymer; and Th represents a 10-hour half-life temperature (° C.) of the organic peroxide. The term "(Tm−Th)" is hereinafter sometimes referred to as "ΔT".

When an organic peroxide having a ΔT of lower than 5° C. is used as the organic peroxide, the through-holes of the polymer particles are blocked, so that expanded beads provided with through-holes cannot be obtained. On the other hand, when an organic peroxide having a ΔT of higher than 45° C. is used, the organic peroxide is not thoroughly impregnated in the polymer particles, and the polymer particles are hardly expanded, so that it becomes difficult to obtain expanded beads.

From the aforementioned viewpoints, the organic peroxide more preferably satisfies the following formula (2), still more preferably satisfies the following formula (3), and most preferably satisfies the following formula (4).

$$10 \leq (Tm-Th) \leq 40 \quad (2)$$

$$15 \leq (Tm-Th) \leq 35 \quad (3)$$

$$20 \leq (Tm-Th) \leq 30 \quad (4)$$

By passing through the step (b), the polymer particles become crosslinked polymer particles.

[Organic Peroxide Satisfying the Relation of the Formula (1)]

The organic peroxide is not particularly limited so long as it is an organic peroxide satisfying the relation of the formula (1).

Specifically, examples thereof include peroxides, such as 1,1-di(t-hexylperoxy)cyclohexane (10-hour half-life temperature: 87° C.), t-butylperoxy-2-ethylhexyl monocarbonate (10-hour half-life temperature: 99° C.), and n-butyl 4,4-bis(t-butylperoxy)valerate (10-hour half-life temperature: 105° C.). These can be used alone or in combination of two or more thereof.

By using the organic peroxide having such a 10-hour half-life temperature, in the steps (a) to (d), the through-holes are hardly filled, and expanded beads provided with through-holes can be obtained. Above all, the 10-hour half-life temperature is preferably 80 to 110° C., and still more preferably 90 to 105° C.

A blending amount of the organic peroxide is preferably 0.1 to 5 parts by weight, and more preferably 0.2 to 3 parts by weight based on 100 parts by weight of the polymer particles. When the blending amount of the organic peroxide falls within the aforementioned range, the crosslinked polymer particles having an appropriate xylene insoluble content are obtained, and not only crosslinked polymer particles can be thoroughly expanded, but also a strength can be given to the polymer particles such that it can thoroughly withstand the expansion.

In the step (b), it is preferred to impregnate the polymer particles with the organic peroxide at a temperature lower than a temperature at which crosslinking of the polymer particles provided with through-holes commences (such a temperature will be sometimes referred to as "impregnation temperature"). The impregnation temperature is not particularly limited so long as it is a temperature lower than a decomposition temperature of the organic peroxide to be used in the step (b) (in the case of using plural organic peroxides, the lowest decomposition temperature is made as a reference), and though it varies with the kind of the organic peroxide to be used, it is typically 90 to 130° C.

Subsequently, it is preferred that by heating the polymer particles provided with through-holes at a temperature equal to or higher than a temperature at which the polymer particles are softened, and the organic peroxide is substantially decomposed (such a temperature will be sometimes referred to as "crosslinking temperature"), crosslinked polymer particles provided with through-holes are obtained. Specifically, it is preferred to heat the polymer particles within a closed vessel at a temperature equal to or higher than a temperature at which the organic peroxide is substantially decomposed.

The heating temperature (crosslinking temperature) for crosslinking is a temperature equal to or higher than a melting point of the block copolymer that constitutes the aforementioned polymer particles and not higher than a temperature of (the melting point+80° C.), and specifically, it is in a range of 100 to 170° C. According to this, crosslinkage of the block copolymer is generated. In addition, a xylene insoluble content of the resulting expanded beads is preferably 30 to 70% by weight. On the occasion of obtaining the expanded beads having the aforementioned xylene insoluble content, in general, a retention time for crosslinking the block copolymer is preferably 1 to 100 minutes, and more preferably 20 to 60 minutes.

(3) Step (c)

The step (c) is a step of impregnating the polymer particles with a blowing agent. The step (c) can be performed in the same manner as in the step (C).

(4) Step (d)

The step (d) is a step of expanding the expandable polymer particles containing a blowing agent and is the same as in the step (D).

Specifically, there are exemplified a method in which the polymer particles (expandable polymer particles) which have been impregnated with the blowing agent by the step (c) are released into an atmosphere under a pressure lower than a pressure within the closed vessel, thereby producing expanded beads; and a method in which after taking out the expandable polymer particles obtained by the step (c), the expandable polymer particles are separately heated and expanded.

It is more preferred to release the expandable polymer particles provided with through-holes into an atmosphere under a pressure lower than a pressure within the closed vessel, thereby producing expanded beads provided with through-holes. Specifically, while keeping the pressure within the closed vessel to a pressure equal to or higher than an atmospheric pressure of the blowing agent, one end under the liquid face within the closed vessel is opened, and the expandable polymer particles containing the blowing agent is released together with a dispersing medium into an atmosphere under a pressure lower than a pressure within the closed vessel from the interior of the closed vessel, typically under atmospheric pressure, to expand the expandable polymer particles, thereby producing expanded beads.

The step (d) is performed after the step (b), and therefore, the expanded beads obtained through the step (d) are expanded crosslinked beads.

2. Expanded Beads

The expanded beads produced through the production method of expanded beads of the second embodiment of the present invention are those provided with through-holes. In the expanded beads, it is preferred that the through-holes derived from the polymer particles provided with through-holes are existent without being filled, and the both ends thereof are opened. It may be considered that such expanded beads are not only suitable for constituting the expanded bead molded article of the first embodiment of the present invention but also useful as cushioning beads and so on because the expanded beads themselves have peculiar physical properties different from the conventional expanded beads.

From the viewpoint of restorability of the expanded beads molded article within a short time, the inside diameter of the expanded beads obtained by the steps (a) to (d) (major axis of the cross-sectional shape of hole) is preferably 1 to 7 mm, and more preferably 1.5 to 5 mm. Meanwhile, an average bead diameter of the expanded beads (outside diameter) is preferably 1.5 to 10 mm, more preferably 1.8 to 8 mm, and still more preferably 2 to 5 mm.

A ratio of the inside diameter of the expanded beads to the outside diameter of the expanded beads is preferably 0.01 to 0.8, and still more preferably 0.1 to 0.8.

(Xylene Insoluble Content)

A xylene insoluble content of the expanded beads molded article by the hot xylene extraction method is preferably 30 to 70% by weight.

So long as the xylene insoluble content falls within the aforementioned range, not only the through-hole shape can be maintained at the time of expansion, but also expanded beads having favorable moldability are provided. From the aforementioned viewpoints, the xylene insoluble content of the expanded beads molded article is preferably 35 to 60% by weight, and still more preferably 40 to 55% by weight. In view of the matter that even in the expanded beads molded article obtained through in-mold molding of the expanded beads, it is not typically considered that the xylene insoluble content does not change at the time of molding, a molded article having the same xylene insoluble content is obtained.

3. Expanded Beads Molded Article

By subjecting the expanded beads produced through the production method of expanded beads of the second embodiment of the present invention to in-mold molding, an expanded beads molded article in which both lightness in weight and restorability within a short time are made compatible with each other can be produced.

The expanded beads molded article can be obtained by filling the expanded beads within a mold and then heat molding with a heating medium, such as steam, according to a conventionally known method. Specifically, similar to the molding method of expanded beads as described in the first embodiment of the present invention, after filling the expanded beads within a mold, by introducing a heating medium, such as steam, into the mold, to heat and expand the expanded beads, and the expanded beads are fusion bonded to each other, whereby an expanded beads molded article having a shape of a molding cavity shaped therein can be obtained.

(Applications of Expanded Beads Molded Article)

The expanded beads molded article obtained through in-mold molding by using the expanded beads produced by the production method of expanded beads of the second embodiment of the present invention is excellent in restorability, and therefore, it is suitable as a shoe sole material, a cushioning material, or an energy absorbing material.

EXAMPLES

The first embodiment and second embodiment of the present invention are hereunder described in more detail by reference to Example, but it should be construed that the present invention is by no means limited thereto. Physical properties and so on of raw materials, polymer particles, expanded beads, and expanded beads molded articles used were measured in the following manners.

(Melting Point)

The melting point of the olefin thermoplastic elastomer was determined in conformity with JIS K7121:1987. Specifically, a peak temperature of an endothermic peak determined by a DSC curve obtained in such a manner that on a basis of the heat flux differential scanning calorimetric measurement method described in JIS K7121:1987, 2 mg of a base material resin in a pellet-like form as a specimen was heated from 30° C. to 200° C. at a heating rate of 10° C./min, then cooled to 30° C. at a cooling rate of 10° C./min, and again heated from 30° C. to 200° C. at a heating rate of 10° C./min was defined as the melting point of the base material resin. As the measurement apparatus, a heat flux differential scanning calorimeter (Model No.: DSC7020, manufactured by SII Nano Technology Inc.) was used.

(Melt Flow Rate)

The melt flow rate of the olefin thermoplastic elastomer was measured under a condition at a temperature of 190° C. under a load of 2.16 kg in conformity with JIS K 7210-1: 2014.

(Type A Durometer Hardness)

The type A durometer hardness of the olefin thermoplastic elastomer was measured in conformity with ASTM D2240.

(Flexural Modulus)

The flexural modulus was measured in conformity with the measurement method described in JIS K7171 (2016). The measurement was performed by producing a specimen of 80×10×4 mm, using a load cell of 10 kg, and performing three-point bending under a condition at an inter-fulcrum distance of 64 mm and a bending rate of 2 mm/min. The flexural modulus was calculated from a gradient of a displacement between 0.5 and 1.0 mm.

The results are shown in the column "Flexural modulus of polymer constituting the molded article" of the column "Molded article" in Tables 1 and 2.

(Inside Diameter of Through-Holes of Polymer Particles of Polymer Particles and Outside Diameter of Polymer Particles)

As for the inside diameter of the through-holes of the polymer particles and the outside diameter of the polymer particles, a cross-sectional photograph of the polymer particles was taken, and the inside diameter (diameter) of the through-holes and the outside diameter of the polymer particles in the cross-sectional photograph were measured. An inside/outside ratio that is an (inside diameter of through-holes of polymer particles)/(outside diameter of polymer particles) ratio was calculated from the obtained results.

<Physical Properties of Expanded Beads>

The apparent density, bulk density, voidage, and inside diameter of through-holes of the expanded beads were measured in the following manners.

(Apparent Density of Expanded Beads)

A 200-mL graduated measuring cylinder was charged with 100 mL of ethanol, and the expanded beads having a bulk volume of about 50 mL, whose weight Wa (g) had been weighed in advance, were sunk in ethanol by using a metal net or the like, followed by reading a volume Va (L) of an elevation of the liquid level. Wa/Va was determined and defined as the apparent density (g/L) of the expanded beads.

The measurement was performed under atmospheric pressure at a temperature of 23° C. and at a relative humidity of 50%.

(Bulk Density of Expanded Beads)

The expanded beads were randomly taken out from the group of expanded beads and put into a graduated measuring cylinder having a capacity of 1 liter, and a large number of expanded beads were accommodated to an extent of a scale of 1 liter such that they became in a naturally accumulated state, while removing static electricity. Subsequently, the weight of the accommodated expanded beads was measured, and the bulk density (g/L) of the expanded beads was calculated from the weight and the accommodated volume (1 liter) of the expanded beads.

The measurement was performed under atmospheric pressure at a temperature of 23° C. and at a relative humidity of 50%.

An (apparent density)/(bulk density) ratio was calculated from the obtained bulk density and apparent density.

(Voidage of Expanded Beads)

The voidage x (%) of the expanded beads was determined in the following manner. That is, an apparent volume A (cm³) expressed by a scale of a graduated measuring cylinder when the expanded beads were charged in the graduated measuring cylinder, and a true volume B (cm³) expressed by a scale of the graduated measuring cylinder corresponding to an increase when the expanded beads of this amount were sunk in the graduated measuring cylinder having the alcohol charged therein were determined, and the voidage x (%) was determined from a relation: x (%)=[(A−B)/A]×100.

(Inside Diameter of Through-Holes of Expanded Beads and Outside Diameter of Expanded Beads)

The inside diameter of the through-holes of the expanded beads was determined in the following manner. That is, the expanded beads were placed on a measurement stage such that the through-holes were perpendicular to the measurement stage, a photograph thereof was taken using a microscope, and the inside diameter of the through-holes in the cross-sectional photograph was measured and calculated. In addition, the outside diameter of the expanded beads was measured by applying a caliper on the expanded beads. An inside/outside ratio that is an (inside diameter of through-holes of expanded beads)/(outside diameter of expanded beads) ratio was calculated from the obtained results.

<Physical Properties of Expanded Beads Molded Article>

The density, xylylene insoluble content, and voidage of the expanded beads molded article produced in each of the Examples and Comparative Examples were measured in the following manners.

(Density of Expanded Beads Molded Article)

Three test pieces were randomly cut out in a size of 50 mm in length×50 mm in width×25 mm in thickness from the expanded beads molded article such that each of the test pieces became in a rectangular parallelepiped form exclusive of a skin layer at the time of molding; the weight and volume of each of the test pieces were measured; the apparent density of the three test pieces was calculated; and an arithmetic average value thereof was defined as the density of the expanded beads molded article and shown in the column "Density of molded article" in Tables 1 and 2.

(Xylene Insoluble Content of Expanded Beads Molded Article or Expanded Beads)

The xylene insoluble content of the expanded beads molded article was determined in the following manner. That is, a sample of about 1.0 g was cut out from the expanded beads molded article or expanded beads, and the sample was weighed and defined as a sample weight W1b. The weighed expanded beads molded article was charged in a 150-mL round bottom flask; 100 mL of xylene was added; the contents were heated with a mantle heater and refluxed for 6 hours by boiling the xylene; an undissolved residue was separated by means of filtration with a 100-mesh metal net; and the resultant was dried with a vacuum dryer at 80° C. for 8 hours or more. A weight W2b of the thus obtained dried product was measured. A weight percentage of this weight W2b to the sample weight W1b [(W2b/W1b)×100] (% by weight) was defined as the xylene insoluble content of the expanded beads molded article. In the step of subjecting the expanded beads to in-mold molding, the xylene insoluble content does not change, and even in the molded article, substantially the same xylene insoluble content is revealed as the expanded beads.

(Voidage of Expanded Beads Molded Article)

A cubic test piece cut out from the expanded beads molded article was sunk in a vessel having ethanol charged therein for 20 seconds, and a true volume Vc (L) of the test piece was determined from an elevation of the liquid level of ethanol. In addition, an apparent volume Vd (L) was determined from the outside dimensions (length×width×height) of the test piece. The voidage of the expanded beads molded article was determined from the determined true volume Vc and apparent volume Vd on a basis of the following formula.

Voidage (%)=[(Vd−Vc)/Vd]×100

<Evaluation of Expanded Beads Molded Article>

(Compression Set of Expanded Beads Molded Article)

Three test pieces were cut out in a size of 50 mm in length×50 mm in width×25 mm in thickness from the expanded beads molded article such that each of the test pieces became in a rectangular parallelepiped form exclusive of a skin layer at the time of molding; the test pieces were allowed to stand for 22 hours at a temperature of 23° C. and 50° C., respectively in an environment at a relative humidity of 50% in a state of being compressed with 25% in the thickness direction on a basis of JIS K6767:1999; the thickness was measured 30 minutes and 24 hours, respectively after releasing the compression; the compression set (%) of each of the test pieces was determined; and an arithmetic average value thereof was defined as the compression set (%).

(Fusion Bonding Properties)

The fusion bonding properties of the expanded beads molded article were evaluated by the following method.

The expanded beads molded article was bent and broken; the number (C1) of expanded beads existent on the broken surface and the number (C2) of fractured expanded beads were determined; a ratio of the fractured expanded beads to the expanded beads (C2/C1×100) was calculated as a degree of material fracture. The measurement was performed five times by using different test pieces; the degree of material fracture was determined for each time; and the obtained values were arithmetically averaged to determine the degree of material fracture.

1. Examples 1a to 6a and Comparative Examples 1a to 5a According to the First Embodiment of the Present Invention The melting point, the melt flow rate, the type A durometer hardness, the flexural modulus, and the inside diameter of through-holes of particles of copolymer of olefin thermoplastic elastomers used for producing expanded beads of the Examples and Comparative Examples [multi-block copolymer (copolymer 1) in Examples 1a to 5a, Comparative Examples 1a to 2a, and Comparative Example 5a; however, polypropylene (PP) in Comparative Examples 3a and 4a] were measured in the following manners.

Example 1a (Production of Particles of Olefin Thermoplastic Elastomer)

As the olefin thermoplastic elastomer, a multi-block copolymer (polymer 1) of a polyethylene block and an ethylene/α-olefin copolymer block having a melting point of 120° C., a melt flow rate of 5.4 g/10 min (at 190° C. under a load of 2.16 kg), a type A durometer hardness of 86, and a flexural modulus of 28 MPa was prepared.

The polymer 1 was put into an extruder and melt kneaded; the molten kneaded product was extruded in a strand-like form from a cylindrical die having a circular slit; and the extrudate was cooled in water and then cut and granulated with a pelletizer so as to have a particles weight of about 5 mg, thereby obtaining cylindrical polymer particles 1 of the multi-block copolymer provided with through-holes.
(Production of Expanded Beads)

1 kg of the obtained polymer particles were blended with 3 liters of water as a dispersing medium, 3 g of kaolin as a dispersant, 0.04 g of a sodium alkylbenzenesulfonate, 0.1 g of aluminum sulfate as a cation species, carbon dioxide (dry ice) as a blowing agent in an amount of 8 parts by weight (80 g) based on 100 parts by weight of the multi-block copolymer, and t-butylperoxy-2-ethylhexyl monocarbonate (TRIGONOX 117 (Tri117); 10-hour half-life temperature: 99° C.) as a crosslinking agent in an amount of 0.8 parts by weight (8 g) based on 100 parts by weight of the multi-block copolymer, and the contents were stirred at 110° C. that is an impregnation temperature, thereby impregnating the polymer particles 1 with the crosslinking agent. Subsequently, the temperature was raised under stirring to 160° C. that is a crosslinking expansion temperature, and after holding for 30 minutes, the contents were released into an atmospheric pressure, to obtain expanded crosslinked beads. At this time, the pressure in the vessel was 4.0 MPa (G).
(Production of Expanded Beads Molded Article)

The obtained expanded beads were put into a closed vessel, which was then pressurized with compressed air of 0.2 MPa (G) for 12 hours to give an internal pressure of 0.10 MPa within the expanded beads. After taking out, the expanded beads were filled in a mold in a flat plate shape having a size of 250 mm in length, 200 mm in width, and 50 mm in thickness at a cracking of 5 mm (namely, 10%). The interior of the mold was heated with a water vapor such that the molding pressure was 0.10 MPa, and air cooling was then performed, followed by taking out the molded article from the mold. The expanded beads molded article was further heated for drying within an oven adjusted at 60° C. for 12 hours and then aged, followed by taking out, thereby obtaining an expanded beads molded article.

The obtained expanded beads molded article was measured with respect to the density, the voidage, and the xylene insoluble content, and evaluated for the compression set at 23° C. and 50° C., respectively and the fusion bonding properties.

Example 2a

Cylindrical polymer particles (polymer particles 2) were obtained in the same operation as in Example 1a, except that in the production of the cylindrical polymer particles 1 of Example 1a, the slit diameter of the extruder was made small, thereby making the inside diameter of the through-holes small. Subsequently, expanded beads were obtained in the same operation as in Example 1a, except that in the production of expanded beads of Example 1a, the polymer particles 2 were used in place of the polymer particles 1. Then, molding was performed under a condition shown in the column "Molding condition" in Table 1, thereby obtaining an expanded beads molded article.

Example 3a

Expanded beads were obtained in the same operation as in Example 2a, except that in the "Production of Expanded Beads" of Example 1a, the crosslinking species was changed to 1,1-di(t-hexylperoxy)cyclohexane (PERHEXA HC; 10-hour half-life temperature: 87° C.). Then, molding was performed under a condition shown in the column "Molding condition" in Table 1, thereby obtaining an expanded beads molded article.

Example 4a

Cylindrical polymer particles (polymer particles 3) were obtained in the same operation as in Example 2a, except that in the production of the cylindrical polymer particles 2 of Example 2a, the aluminum sulfate was not added. Subsequently, expanded beads were obtained in the same operation as in Example 1a, except that in the production of expanded beads of Example 1a, the polymer particles 3 were used in place of the polymer particles 1. Then, molding was performed under a condition shown in the column "Molding condition" in Table 1, thereby obtaining an expanded beads molded article.

Example 5a

Expanded beads were obtained in the same operation as in Example 1a, except that in Example 1a, the expansion condition was changed to the condition shown in Table 1, and that the amount of carbon dioxide (dry ice) as a blowing agent was changed to 3 parts by weight (30 g) based on 100 parts by weight of the multi-block copolymer. Then, molding was performed under a condition shown in the column "Molding condition" in Table 1, thereby obtaining an expanded beads molded article.

Example 6a

Expanded beads were obtained in the same operation as in Example 1a, except that in Example 1a, the expansion condition was changed to the condition shown in Table 2. Then, molding was performed under a condition shown in the column "Molding condition" in Table 2, thereby obtaining an expanded beads molded article.

Comparative Example 1a

Expanded beads were obtained in the same operation as in Example 1a, except that n-butyl 4,4-di(t-butylperoxy)valerate (PERHEXA V; 10-hour half-life temperature: 72° C.) was used as the crosslinking agent. Then, molding was performed under a condition shown in Table 1, thereby obtaining an expanded beads molded article.

Comparative Example 2a

In the "production of beads of multi-block copolymer" of Example 1a, the "cylindrical die having a circular slit" was changed to a "die not having a circular slit", thereby obtaining polymer particles 101 of a multi-block copolymer not provided with through-holes. Expanded beads were obtained in the same operation as in Example 1a, except that the polymer particles 101 were used, and that dicumyl peroxide (PERCUMYL D; 10-hour half-life temperature: 116° C.) was used as the crosslinking agent. Then, molding was performed under a condition shown in Table 1, thereby obtaining an expanded beads molded article.

Comparative Example 3a

Polymer particles of polypropylene (PP) (melting point: 142° C., flexural modulus: 870 MPa) provided with through-holes were produced in the same manner as in Example 1a. 1 kg of the particles of polypropylene were charged together with 3 liters of water as a dispersing medium in a 5-liter closed vessel. 0.3 parts by weight of kaolin as a dispersant and 0.004 parts by weight of a surfactant (sodium alkylbenzenesulfonate) based on 100 parts by weight of the polymer particles were further added within the closed vessel, and carbon dioxide as a blowing agent was added within the closed vessel such that the pressure in the vessel was a value shown in Table 1. The contents were then heated under stirring to raise the temperature to an expansion temperature shown in Table 1, and after holding at that temperature for 15 minutes, the contents in the vessel were released into an atmospheric pressure, to obtain expanded beads. In addition, an expanded beads molded article was obtained in the same manner as in Example 1a, except for adopting the condition shown in Table 1.

Comparative Example 4a

Polymer particles of polypropylene (PP) (melting point: 142° C., flexural modulus: 870 MPa) not provided with through-holes were produced in the same manner as in Comparative Example 2a. In addition, expanded beads were obtained in the same manner as in Comparative Example 3a, and an expanded beads molded article was obtained in the same manner as in Comparative Example 2a, except for adopting the condition shown in Table 1.

Comparative Example 5a

An expanded beads molded article was obtained in the same manner as in Comparative Example 2a, except for changing the expansion condition to a condition shown in the column "Expansion condition" in Table 2.

TABLE 1

| | | | Example 1a | Example 2a | Example 3a | Example 4a | Example 5a |
|---|---|---|---|---|---|---|---|
| | Polymer | | Polymer 1 | Polymer 1 | Polymer 1 | Polymer 1 | Polymer 1 |
| | Inside diameter of through-holes of polymer particles used | mm | 1.15 | 0.41 | 1.15 | 0.41 | 1.15 |
| Crosslinking condition | Crosslinking agent | Species | Tri117 | Tri117 | PERHEXA HC | Tri117 | Tri117 |
| | | Parts by weight | 1.0 | 1.0 | 4.4 | 1.0 | 1.0 |
| | Impregnation temperature | ° C. | 110 | 110 | 110 | 110 | 110 |
| | Crosslinking temperature | ° C. | 160 | 160 | 160 | 160 | 160 |
| | Retention time | min | 30 | 30 | 30 | 30 | 30 |
| Expansion condition | Expansion temperature | ° C. | 160.0 | 160.0 | 160.0 | 160.0 | 160.0 |
| | Vapor pressure | MPa | 4.0 | 4.0 | 4.0 | 4.0 | 4.0 |
| Expanded beads | Apparent density | g/L | 74 | 77 | 94 | 82 | 74 |
| | Bulk density | g/L | 35 | 41 | 40 | 44 | 35 |
| | (Apparent density)/(Bulk density) | | 2.1 | 1.9 | 2.4 | 1.9 | 2.1 |
| | Voidage | % | 27 | 15 | 30 | 14 | 27 |
| | Inside diameter of through-holes | mm | 2.2 | 1.0 | 2.5 | 1.4 | 2.2 |
| Molding condition | Internal pressure | MPa | 0.10 | 0.10 | 0.10 | 0.10 | 0.10 |
| | Cracking | % | 10 | 10 | 10 | 10 | 30 |
| | Molding pressure | MPa | 0.10 | 0.10 | 0.10 | 0.10 | 0.10 |
| Molded article | Density of molded article | g/L | 55 | 50 | 45 | 53 | 68 |
| | Voidage | % | 28 | 15 | 29 | 13 | 8 |
| | Xylene insoluble content | % by weight | 48 | 50 | 45 | 52 | 48 |
| | Flexural modulus of polymer constituting the molded article | % | 30 | 30 | 30 | 30 | 30 |
| | Fusion bonding properties (degree of material fracture %) C | | 80 ≤ C < 95 | 80 ≤ C < 95 | 80 ≤ C < 95 | 80 ≤ C < 95 | 80 ≤ C < 95 |
| Physical properties | Compression set | 23° C. 30 minutes after release | % | 13.8 | 13.8 | 13.9 | 14.0 | 13.0 |
| | | 22 hours after release | % | 1.0 | 1.0 | 1.0 | 1.0 | 1.0 |
| | | 50° C. 30 minutes after release | % | 18.8 | 18.8 | 19.0 | 19.2 | 18.1 |
| | | 22 hours after release | % | 5.6 | 6.4 | 6.0 | 6.8 | 5.0 |

| | | | Comparative Example 1a | Comparative Example 2a | Comparative Example 3a | Comparative Example 4a |
|---|---|---|---|---|---|---|

TABLE 1-continued

|  |  |  | Polymer 1 | Polymer 1 | PP | PP |
|---|---|---|---|---|---|---|
| Polymer |  |  | Polymer 1 | Polymer 1 | PP | PP |
| Inside diameter of through-holes of polymer particles used |  | mm | 1.15 | 0 | 0.6 | 0 |
| Crosslinking condition | Crosslinking agent | Species | PERHEXA V | PERCUMYL D | — | — |
|  |  | Parts by weight | 2.0 | 0.8 | — | — |
|  | Impregnation temperature | °C. | 110 | 110 | — | — |
|  | Crosslinking temperature | °C. | 160 | 160 | — | — |
|  | Retention time | min | 30 | 30 | — | — |
| Expansion condition | Expansion temperature | °C. | 160.0 | 160.0 | 150.3 | 150.3 |
|  | Vapor pressure | MPa | 4.0 | 4.0 | 2.5 | 3.0 |
| Expanded beads | Apparent density | g/L | 81 | 83 | 91 | 57 |
|  | Bulk density | g/L | 49 | 52 | 38 | 35 |
|  | (Apparent density)/(Bulk density) |  | 1.7 | 1.6 | 2.4 | 1.6 |
|  | Voidage | % | 3 | 0 | 33 | 0 |
|  | Inside diameter of through-holes | mm | 0.1 | 0 | 1.5 | 0 |
| Molding condition | Internal pressure | MPa | 0.10 | 0.14 | 0 | 0.10 |
|  | Cracking | % | 20 | 20 | 10 | 10 |
|  | Molding pressure | MPa | 0.14 | 0.14 | 0.18 | 0.30 |
| Molded article | Density of molded article | g/L | 55 | 53 | 50 | 50 |
|  | Voidage | % | 2 | 1 | 30 | 2 |
|  | Xylene insoluble content | % by weight | 48 | 54 | — | — |
|  | Flexural modulus of polymer constituting the molded article | % | 30 | 30 | 870 | 870 |
|  | Fusion bonding properties (degree of material fracture %) |  | C 80 ≤ C < 95 | 80 ≤ C < 95 | 80 ≤ C < 95 | 80 ≤ C < 95 |
| Physical properties | Compression set | 23° C. 30 minutes after release % | 17.9 | 18.0 | 18.3 | 17.7 |
|  |  | 22 hours after release % | 1.5 | 1.4 | 9.9 | 8.8 |
|  |  | 50° C. 30 minutes after release % | 24.0 | 24.0 | 23.8 | 22.5 |
|  |  | 22 hours after release % | 11.0 | 11.0 | 21.6 | 20.4 |

As shown in Table 1, in comparison of Examples 1a to 5a with Comparative Examples 1a and 2a, which have a density of molded article of the same level, in the case where the voidage of the expanded beads molded article falls outside the range of 5 to 30%, it is noted that the molded articles in which the compression set at the time of 25% compression is low are obtained and are excellent in restorability.

In comparison of Examples 1a and 3a with Examples 2a and 4a, it is noted that the expanded beads molded articles having a higher voidage of molded article are lower in compression set at a high temperature and more excellent in restorability.

In comparison of Comparative Example 3a with Comparative Example 4a, in the polypropylene resin, between the in-mold molded article of expanded beads not provided with through-holes (Comparative Examples 4a) and the in-mold molded article of expanded beads provided with through-holes (Comparative Example 3a), it is noted that the in-mold molded article of expanded beads provided with through-holes are higher in compression set at the time of 25% compression.

In contrast, in comparison of Example 1a with Comparative Example 1a, it is noted that the compression set at the time of 25% compression of the in-mold molded article of expanded beads provided with through-holes (Example 1a) is smaller than that of the in-mold molded article of expanded beads not substantially provided with through-holes (Comparative Example 1a). That is, in the expanded beads composed of an olefin thermoplastic elastomer, it is noted that characteristics quite reverse to those of the expanded beads composed of polypropylene are exhibited. This demonstrates that the entire expanded beads molded article first becomes especially excellent in restorability. As this factor, there is an effect for improving the restorability due to voids formed in the aforementioned expanded beads molded article, furthermore, there is an effect that not only the voids are readily restored as the cell membrane is composed of a specified elastomer, but also the restorability is improved in the case where the cells are pressed.

TABLE 2

|  |  |  | Example 6a | Comparative Example 5a |
|---|---|---|---|---|
| Polymer |  |  | Polymer 1 | Resin1 |
| Inside diameter of through-holes of polymer particles used |  | mm | 1.15 | 0 |
| Crosslinking | Crosslinking agent | Species | Tri117 | PERCUMYL D |

TABLE 2-continued

|  |  |  | Example 6a | Comparative Example 5a |
|---|---|---|---|---|
| condition |  | Parts by weight | 1.0 | 0.8 |
|  | Impregnation temperature | ° C. | 110 | 110 |
|  | Crosslinking temperature | ° C. | 160 | 160 |
|  | Retention time | min | 30 | 30 |
| Expansion condition | Expansion temperature | ° C. | 160.0 | 160.0 |
|  | Vapor pressure | MPa | 1.5 | 1.7 |
| Expanded beads | Apparent density | g/L | 195 | 180 |
|  | Bulk density | g/L | 95 | 113 |
|  | (Apparent density)/(Bulk density) |  | 2.1 | 1.6 |
|  | Voidage | % | 22 | 0 |
|  | Inside diameter of through-holes | mm | 1.9 | 0 |
| Molding condition | Internal pressure | MPa | 0.10 | 0.14 |
|  | Cracking | % | 10 | 20 |
|  | Molding pressure | MPa | 0.14 | 0.14 |
| Molded article | Density of molded article | g/L | 117 | 137 |
|  | Voidage | % | 22 | 2 |
|  | Xylene insoluble content | % by weight | 52 | 51 |
|  | Flexural modulus of polymer constituting the molded article | % | 30 | 30 |
|  | Fusion bonding properties (degree of material fracture %) C |  | 80 ≤ C < 95 | 80 ≤ C < 95 |
| Physical properties | Compression set | 23° C. 30 minutes after release | % | 7.6 | 13.0 |
|  |  | 22 hours after release | % | 1.1 | 2.0 |
|  |  | 50° C. 30 minutes after release | % | 9.9 | 17.0 |
|  |  | 22 hours after release | % | 3.8 | 6.0 |

As shown in Table 2, in comparison of Examples 6a with Comparative Example 5a, which are a molded article having a relatively high density, in the case where the voidage of the expanded beads molded article falls outside the range of 5 to 40% (Example 6a), it is noted that the molded article in which the compression set at the time of 25% compression is low is obtained and is excellent in restorability.

The compression set at the time of 25% compression of Comparative Example 5a in which the density of molded article is 137 g/L is the same level of the molded articles having a density of molded article of 50 g/L in the Examples, and in the case where the compression set at the time of 25% compression is made as a reference, even when the density of molded article is made low, the same physical properties can be exhibited, and therefore, it becomes possible to allow cushioning materials and so on to more lighten in weight.

2. Examples 1b to 6b and Comparative Examples 1b to 2b According to the Second Embodiment of the Present Invention Example 1b (Production of Particles of Block Copolymer (I))

As the block copolymer (I), a multi-block copolymer (polymer 1) of a polyethylene block and an ethylene/1-octane copolymer block having a melting point of 120° C., a melt flow rate of 5.4 g/10 min (at 190° C. under a load of 2.16 kg), a type A durometer hardness of 86, and a flexural modulus of 28 MPa was prepared.

The polymer 1 was put into an extruder and melt kneaded; the molten kneaded product was extruded in a strand-like form from a cylindrical die having a circular slit; and the extrudate was cooled in water and then cut and granulated with a pelletizer so as to have a particles weight of about 5 mg, thereby obtaining cylindrical polymer particles 1 of the multi-block copolymer provided with through-holes.
(Production of Expanded Crosslinked Beads)

1 kg of the obtained polymer particles were blended with 3 liters of water as a dispersing medium, 3 g of kaolin as a dispersant, 0.04 g of a sodium alkylbenzenesulfonate, 0.1 g of aluminum sulfate, and t-butylperoxy-2-ethylhexyl monocarbonate (TRIGONOX 117 (Tri117), manufactured by Kayaku Akzo Corporation; 10-hour half-life temperature: 99° C.) as an organic peroxide (crosslinking agent) in an amount of 0.8 part by weight (8 g) based on 100 parts by weight of the multi-block copolymer, and carbon dioxide (dry ice) as a blowing agent in an amount of 2.5 parts by weight (25 g) based on based on 100 parts by weight of the multi-block copolymer was charged in a closed vessel having a capacity of 5 liters. The temperature was raised under stirring to 160° C. that is a crosslinking expansion temperature, and after holding for 30 minutes, the contents were released at an expansion temperature of 160° C. into an atmospheric pressure, to obtain expanded crosslinked beads. At this time, the vapor pressure was 1.5 MPa (G). In the step (d), the temperature when the expandable polymer particles having the blowing agent impregnated therein was released under a lower pressure than that within the closed vessel was defined as the expansion temperature.
(Production of Expanded Beads Molded Article)

The obtained expanded crosslinked beads were put into a closed vessel, which was then pressurized with compressed air of 0.2 MPa (G) for 12 hours to give an internal pressure of 0.10 MPa within the expanded beads. After taking out, the expanded crosslinked beads were filled in a mold in a flat plate shape having a size of 250 mm in length, 200 mm in width, and 50 mm in thickness at a cracking of 5 mm (namely, 10%). The interior of the mold was heated with a water vapor such that the molding pressure was 0.14 MPa (G), and air cooling was then performed, followed by taking out the molded article from the mold. The expanded crosslinked beads molded article was further heated for drying within an oven adjusted at 60° C. for 12 hours and then aged, followed by taking out, thereby obtaining an expanded crosslinked beads molded article.

The obtained expanded crosslinked beads molded article was measured with respect to the density, the voidage, and the xylene insoluble content, and evaluated for the compression set at 23° C. and 50° C., respectively and the fusion bonding properties. In addition, the compression physical properties when the expanded crosslinked beads molded article was compressed in a predetermined volume were evaluated.

Example 2b

Expanded crosslinked beads were obtained in the same operation as in Example 1b, except that in the production of expanded crosslinked beads of Example 1b, the expansion was performed under a condition shown in the column "Expansion condition" for the expansion condition. Subsequently, molding was performed by the same method as in Example 1b, except that the obtained expanded crosslinked beads were used, and that a condition shown in the column "Molding condition" in Table 3 was adopted as the molding condition, thereby obtaining an expanded crosslinked beads molded article.

Example 3b

Cylindrical polymer particles (polymer particles 2) were obtained in the same operation as in Example 1b, except that in the production of the cylindrical polymer particles 1 of Example 1b, the slit diameter of the extruder was made small, thereby making the inside diameter of the through-holes small. Subsequently, expanded crosslinked beads were obtained in the same operation as in Example 2b, except that in the production of expanded crosslinked beads of Example 2b, the polymer particles 2 were used in place of the polymer particles 1. Then, molding was performed under a condition shown in the column "Molding condition" in Table 3, thereby obtaining an expanded crosslinked beads molded article.

Example 4b

Expanded crosslinked beads were obtained in the same operation as in Example 1b, except that in the production of expanded crosslinked beads of Example 1b, the organic peroxide species was changed to 1,1-di(t-hexylperoxy)cyclohexane (PERHEXA HC, manufactured by NOF Corporation; 10-hour half-life temperature: 87° C.), and that expansion was performed under a condition shown in the column "Expansion condition" in Table 3. Subsequently, molding was performed in the same method as in Example 1b, except that the obtained expanded crosslinked beads were used, and that the molding condition was changed to a condition shown in the column "Molding condition" in Table 3, thereby obtaining an expanded crosslinked beads molded article.

Example 5b

Expanded crosslinked beads were obtained in the same operation as in Example 3b, except that the aluminum sulfate was not added. Then, molding was performed under a condition shown in the column "Molding condition" shown in Table 4, thereby obtaining an expanded crosslinked beads molded article.

Example 6b

Expanded crosslinked beads were obtained in the same operation as in Example 2b, except that the organic peroxide was changed to n-butyl 4,4-di(t-butylperoxy)valerate (PERHEXA V; 10-hour half-life temperature: 105° C.). Then, molding was performed under a condition shown in the column "Molding condition" shown in Table 4, thereby obtaining an expanded crosslinked beads molded article. In the obtained expanded beads, though through-holes were formed, the inside diameter thereof became small.

Comparative Example 1b

Expanded crosslinked beads were obtained in the same operation as in Example 3b, except that the organic peroxide was changed to dicumyl peroxide (PERCUMYL D; 10-hour half-life temperature: 116° C.). Then, molding was performed under a condition shown in the column "Molding condition" shown in Table 4, thereby obtaining an expanded crosslinked beads molded article. The obtained expanded crosslinked beads were expanded crosslinked beads not provided with through-holes, in which a hollow portion derived from the polymer particles did not exist.

Comparative Example 2b

Expanded crosslinked beads were obtained in the same operation as in Comparative Example 1b, except that the organic peroxide was changed to t-butyl peroxy-2-ethylhexanoate (PERBUTYL O: 10-hour half-life temperature: 72° C.).

The obtained expanded crosslinked beads were expanded crosslinked beads not provided with through-holes.

Since the apparent density of the expanded beads was high, a favorable molded article could not be produced, and therefore, the physical properties could not be measured.

TABLE 3

|  |  |  | Example 1b | Example 2b | Example 3b | Example 4b |
|---|---|---|---|---|---|---|
| Polymer particles | Melting point Tm of copolymer | ° C. | 120 | 120 | 120 | 120 |
|  | Inside diameter of through-holes | mm | 1.15 | 1.15 | 0.41 | 1.15 |
|  | Outside diameter of polymer particles | mm | 1.95 | 1.95 | 0.85 | 1.95 |
|  | Inside/outside ratio |  | 1.59 | 1.59 | 0.48 | 0.59 |
| Crosslinking condition | Organic peroxide | Species | Tri117 | Tri117 | Tri117 | PERHEXA HC |
|  |  | Parts by weight | 1.0 | 1.0 | 1.0 | 4.4 |
|  | 10-hour half-life temperature Th of organic peroxide | ° C. | 99.0 | 99.0 | 99.0 | 87.0 |
|  | Tm − Th | ° C. | 21.0 | 21.0 | 21.0 | 33.0 |
|  | Impregnation temperature of organic peroxide | ° C. | 110 | 110 | 110 | 110 |
|  | Crosslinking temperature | ° C. | 160 | 160 | 160 | 160 |
|  | Retention time | min | 30 | 30 | 30 | 30 |

TABLE 3-continued

|  |  |  | Example 1b | Example 2b | Example 3b | Example 4b |
|---|---|---|---|---|---|---|
| Expansion condition | Expansion temperature | °C. | 160.0 | 160.0 | 160.0 | 160.0 |
|  | Vapor pressure | MPa | 1.5 | 4.0 | 4.0 | 4.0 |
| Expanded beads | Apparent density | g/L | 195 | 74 | 77 | 94 |
|  | Bulk density | g/L | 95 | 35 | 41 | 40 |
|  | (Apparent density)/(Bulk density) |  | 2.1 | 2.1 | 1.9 | 2.4 |
|  | Voidage | % | 22 | 27 | 15 | 30 |
|  | Inside diameter of through-holes | mm | 1.9 | 2.2 | 1.0 | 2.5 |
|  | Outside diameter of expanded beads | mm | 3.4 | 4.1 | 3.5 | 4.3 |
|  | Inside/outside ratio |  | 0.54 | 0.54 | 0.29 | 0.58 |
|  | Xylene insoluble content | % by weight | 52 | 48 | 50 | 45 |
| Molding condition | Internal pressure | MPa | 0.10 | 0.10 | 0.10 | 0.10 |
|  | Cracking | % | 10 | 10 | 10 | 10 |
|  | Molding pressure | MPa | 0.14 | 0.10 | 0.10 | 0.10 |
| Molded article | Density of molded article | g/L | 117 | 55 | 50 | 47 |
|  | Voidage | % | 22 | 28 | 15 | 29 |
|  | Fusion bonding properties (degree of material fracture %) C |  | 80 ≤ C | 80 ≤ C | 80 ≤ C | 80 ≤ C |
| Physical properties of molded article | Compression set 23° C. 30 minutes after release | % | 7.6 | 13.8 | 13.8 | 13.9 |
|  | 22 hours after release | % | 1.1 | 1.0 | 1.0 | 1.0 |
|  | 50° C. 30 minutes after release | % | 9.9 | 18.8 | 18.8 | 19.0 |
|  | 22 hours after release | % | 3.8 | 5.6 | 6.4 | 6.0 |
| Compression physical properties of molded article | 50% E/A | J/L | 50 | 13 | 17 | 15 |
|  | 5% compression stress | kPa | 31 | 7 | 9 | 8 |
|  | 10% compression stress | kPa | 53 | 11 | 15 | 11 |
|  | 20% compression stress | kPa | 84 | 19 | 26 | 19 |
|  | 25% compression stress | kPa | 98 | 24 | 31 | 25 |
|  | 50% compression stress | kPa | 202 | 63 | 80 | 64 |

TABLE 4

|  |  |  | Example 5b | Example 6b | Comparative Example 1b | Comparative Example 2b |
|---|---|---|---|---|---|---|
| Polymer particles | Melting point Tm of copolymer | °C. | 120 | 120 | 120 | 120 |
|  | Inside diameter of through-holes | mm | 0.41 | 1.15 | 0.41 | 0.41 |
|  | Outside diameter of polymer particles | mm | 0.85 | 1.95 | 0.85 | 0.85 |
|  | Inside/outside ratio |  | 0.48 | 0.59 | 0.48 | 0.48 |
| Crosslinking condition | Organic peroxide | Species | Tri117 | PERHEXA V | PERCUMYL D | PERBUTYL O |
|  |  | Parts by weight | 1.0 | 2.0 | 0.8 | 0.8 |
|  | 10-hour half-life temperature Th of organic peroxide | °C. | 99.0 | 105.0 | 116.0 | 72.0 |
|  | Tm − Th | °C. | 21.0 | 15.0 | 4.0 | 48.0 |
|  | Impregnation temperature of organic peroxide | °C. | 110 | 110 | 110 | 110 |
|  | Crosslinking temperature | °C. | 160 | 160 | 160 | 160 |
|  | Retention time | min | 30 | 30 | 30 | 30 |
| Expansion condition | Expansion temperature | °C. | 160.0 | 160.0 | 160.0 | 160.0 |
|  | Vapor pressure | MPa | 4.0 | 4.0 | 4.0 | 4.0 |
| Expanded beads | Apparent density | g/L | 82 | 81 | 99 | 643 |
|  | Bulk density | g/L | 44 | 49 | 62 | 409 |
|  | (Apparent density)/(Bulk density) |  | 1.9 | 1.7 | 1.6 | 1.6 |
|  | Voidage | % | 14 | 3 | 0 | 0 |
|  | Inside diameter of through-holes | mm | 1.4 | 0.1 | 0 | 0 |
|  | Outside diameter of expanded beads | mm | 3.5 | 3.3 | 4.2 | 1.3 |
|  | Inside/outside ratio |  | 0.40 | 0.03 | — | — |
|  | Xylene insoluble content | % by weight | 52 | 48 | 50 | 0 |
| Molding condition | Internal pressure | MPa | 0.10 | 0.10 | 0.14 | Measurement impossible |
|  | Cracking | % | 10 | 20 | 20 |  |

TABLE 4-continued

|  |  |  |  | Example 5b | Example 6b | Comparative Example 1b | Comparative Example 2b |
|---|---|---|---|---|---|---|---|
|  |  | Molding pressure |  | MPa | 0.10 | 0.14 | 0.14 |
| Molded article |  | Density of molded article |  | g/L | 53 | 45 | 75 |
|  |  | Voidage |  | % | 13 | 2 | 13 |
|  |  | Fusion bonding properties (degree of material fracture %) | C | | 80 ≤ C | 80 ≤ C | 80 ≤ C |
| Physical properties of molded article | Compression set | 23° C. | 30 minutes after release | % | 14.0 | 17.9 | 14.0 |
|  |  |  | 22 hours after release | % | 1.0 | 1.5 | 1.6 |
|  |  | 50° C. | 30 minutes after release | % | 19.2 | 24.0 | 22.0 |
|  |  |  | 22 hours after release | % | 6.8 | 11.0 | 8.0 |
| Compression physical properties of molded article |  | 50% E/A |  | J/L | 16 | 22 | 21 |
|  |  | 5% compression stress |  | kPa | 8 | 10 | 10 |
|  |  | 10% compression stress |  | kPa | 14 | 18 | 17 |
|  |  | 20% compression stress |  | kPa | 23 | 32 | 31 |
|  |  | 25% compression stress |  | kPa | 29 | 40 | 38 |
|  |  | 50% compression stress |  | kPa | 75 | 102 | 97 |

As is noted from the "Inside diameter of through-holes" in the column "Expanded beads" in Tables 3 to 4, all of the expanded crosslinked beads of Examples 1b to 6b were formed as expanded crosslinked beads provided with through-holes. In addition, favorable expanded beads molded articles were obtained. But, expanded crosslinked beads produced by using the crosslinking agent not satisfying the formula (1) as the crosslinking agent, only those not provided with through-holes were obtained.

The invention claimed is:

1. A method of producing expanded beads provided with through-holes, wherein the expanded beads consist of a multi-block copolymer of a polyethylene block and an ethylene/octene copolymer block, an inside diameter of the expanded beads is 1 to 5 mm, a ratio of the inside diameter of the expanded beads to an outside diameter of the expanded beads is 0.29 to 0.8, the expanded beads having a voidage of 5 to 30%, the method comprising:

Step (a): dispersing polymer particles provided with through-holes and composed of the multi-block copolymer of the polyethylene block and the ethylene/octene copolymer block in a dispersing medium within a closed vessel,
wherein the multi-block copolymer has a flexural modulus of 10 to 50 MPa,
a type A durometer hardness of the multi-block copolymer is 75 to 88, and
the polymer particles have an inside diameter of 0.2 to 3 mm, an outside diameter of the polymer particles is 0.5 to 3 mm, and a ratio of the inside diameter to the outside diameter of the polymer particles of 0.2 to 0.7, wherein the polymer particles are extruded from a cylindrical die having a circular slit and are cut;

Step (b): impregnating the polymer particles with an organic peroxide satisfying a relation of the following formula (1) at a temperature lower than decomposition temperature of the organic peroxide, and crosslinking the polymer particles at a temperature equal to or higher than a melting point of the multi-block copolymer of the polyethylene block and the ethylene/octene copolymer block, which constitutes the polymer particles, and not higher than a temperature of (the melting point+80° C.):

$$5 \leq (Tm - Th) \leq 45 \quad (1)$$

wherein Tm represents a melting point (C) of the multi-block copolymer of the polyethylene block and the ethylene/octene copolymer block, which constitutes the polymer particles; and Th represents a 10-hour half-life temperature (° C.) of the organic peroxide, wherein the 10-hour half-life temperature Th of the organic peroxide is from 87 to 100° C.;

Step (c): impregnating the resulting polymer particles with a blowing agent; and Step (d): expanding the resulting expandable polymer particles containing the blowing agent.

2. The method of producing expanded beads according to claim 1, further comprising adding aluminum sulfate in an amount of 0.01 to 5 parts by weight based on 100 parts by weight of the polymer particles.

3. The method of producing expanded beads according to claim 1, wherein the expanded beads have an apparent density of 40 to 200 g/L.

4. A method of producing an expanded beads molded article, the method comprising subjecting the expanded beads produced by the method according to claim 1 to in-mold molding.

5. The method of producing expanded beads according to claim 1, wherein a melt flow rate (MFR) at 190° C. of 2.16 kg of the multi-block copolymer is 2 to 10 g/10 min.

* * * * *